UNITED STATES PATENT OFFICE.

MORITZ RINO, OF WILLIAMSBURG, NEW YORK.

IMPROVEMENT IN THE MANUFACTURE OF VINEGAR.

Specification forming part of Letters Patent No. 46,943, dated March 21, 1865.

*To all whom it may concern:*

Be it known that I, MORITZ RINO, of Brooklyn, in the county of Kings and State of New York, have invented certain new and useful Improvements in the Manufacture of Vinegar; and I do hereby declare that the following is a full, clear, and exact description of my process.

My invention consists in the manufacture of vinegar by the quick process from vegetable produce which contains starch, saccharine substances, or both starch and saccharine substances, such as cereals, potatoes, or other roots, sugar-cane or its refuse, molasses, &c.

To enable others skilled in the art to make and use my invention, I will proceed to describe my process.

The produce to be employed in my process, when of a hard or solid nature, like the grains of cereals, is ground; when of a softer nature, like potatoes or other roots, is cut or mashed, and when properly reduced boiling water is added and the whole converted into a mash, is thoroughly worked, and when all parts are properly reduced the liquid is drawn off. To this liquid is then added a small quantity of yeast, by which vinous fermentation is started, and it is left in this state of fermentation for a few days. This liquid must then be prepared so as to be suitable for the vinegar manufacture, and as it contains a considerable amount of gluten and fibrine, which would clog up any vat or filtering apparatus, those must be removed first. This I accomplish by the application of a small quantity of tannin, by which the gluten and fibrine are precipitated, and I obtain a liquid which can be clarified and filtered, and which is of a vinous nature, and excellently adapted to the manufacture of vinegar by the quick process, and which results in a superior article of clear and strong vinegar.

The filter which I have found to be very efficient for clarifying said vinous liquor I make by inserting a false bottom into a vat. On said false bottom I place a layer of felt, on that about two inches of paper-pulp, and on that again a layer of felt. After the liquid has passed through the filter it is perfectly clarified, and constitutes a pure, clear liquid, without any admixture of adulterated or obnoxious substances, and which is highly adapted to the manufacture of vinegar by the quick process. This is passed over the vinegar-vats in the ordinary manner well known in the quick process.

When sap of sugar-cane or other unrefined saccharine substance is used I do not apply boiling water thereto, but simply dilute it with a sufficient quantity of water, and I add a small quantity of yeast to start the fermentation, and in this case a proportionate small quantity of tannin may be employed for clarifying, as said liquid contains a proportionate small quantity only of gluten and fibrine, and can be filtered directly through the filter above described.

It will be seen that in this process I employ only the natural and unadulterated produce, which is not only the best, but also the cheapest possible article that can be found. The ingredients (yeast and tannin) which I use for starting the fermentation and for clarifying are used in very small quantities only, and the latter is entirely precipitated and separated before the liquid is filtered, and it is thus obvious that I am enabled to produce a cheaper and better article of vinegar than has been done heretofore.

I do not confine my clarifying process to the application of tannin, as other equivalent ingredients may be used equally well for precipitating the gluten and fibrine of the macerated vegetable matter.

Having thus fully described the nature of my invention, what I claim herein as new, and desire to secure by Letters Patent, is—

The manufacture of vinegar by the quick process directly from the natural unmanufactured or unrefined vegetable produce which contains starch or saccharine matter, or both starch and saccharine matter, substantially in the manner herein described.

MORITZ RINO.

Witnesses:
 AARON FRANK,
 MECHD. BROPHY.